United States Patent [19]
Fukai

[11] Patent Number: 5,776,346
[45] Date of Patent: *Jul. 7, 1998

[54] METHOD AND APPARATUS FOR MAKING WATER HAVING PURIFIED AND ACTIVATED FUNCTIONS

[76] Inventor: Toshiharu Fukai, 1112-1, Ooaza-hakeyama, Kitamimaki-mura, Kitasaku-gun, Nagano, Japan

[*] Notice: The term of this patent shall not extend beyond the expiration date of Pat. No. 5,599,455.

[21] Appl. No.: 637,736
[22] PCT Filed: Oct. 14, 1994
[86] PCT No.: PCT/JP94/01733
§ 371 Date: Apr. 26, 1996
§ 102(e) Date: Apr. 26, 1996
[87] PCT Pub. No.: WO95/13245
PCT Pub. Date: May 18, 1995

[30] Foreign Application Priority Data

Nov. 9, 1993 [JP] Japan .................. 5-302179

[51] Int. Cl.⁶ .................. C02F 1/42; C02F 1/48
[52] U.S. Cl. .................. 210/663; 210/687; 210/688; 210/748; 210/749; 210/243; 210/259; 210/266; 210/283; 210/284; 204/155; 204/164
[58] Field of Search .................. 210/663, 667, 210/668, 669, 748, 284, 749, 266, 259, 243, 283, 691, 692, 693, 687, 688, 695, 222, 223; 204/155, 164

[56] References Cited

U.S. PATENT DOCUMENTS

| | | | |
|---|---|---|---|
| 4,000,056 | 12/1976 | Squires | 210/275 |
| 4,127,485 | 11/1978 | Baker et al. | 210/169 |
| 4,177,142 | 12/1979 | Halbfoster | 210/681 |
| 4,187,120 | 2/1980 | Kunin et al. | 210/777 |
| 4,430,228 | 2/1984 | Paterson | 210/668 |
| 4,454,044 | 6/1984 | Klein | 210/663 |
| 4,704,210 | 11/1987 | Boze et al. | 210/778 |
| 5,169,528 | 12/1992 | Karbachsch et al. | 210/264 |
| 5,599,455 | 2/1997 | Hukai | 210/663 |

Primary Examiner—Cynthia L. Nessler
Attorney, Agent, or Firm—Lorusso & Loud

[57] ABSTRACT

Method and apparatus for treating water used in daily life such as city or well water to obtain purified and activated water having various functions such as detergency, bactericidal and antifungal actions, surface activity, cooling action, and in vivo activating function. Soft water generators, each containing an ion exchange resin therein, an ion generator containing a mixture of tourmaline and aluminum oxide, and a rock container containing a rock providing negative ions are connected in series. Water is passed through the ion exchange resin, the tourmaline/aluminum oxide and the rock providing negative ions, in this order.

26 Claims, 4 Drawing Sheets

METHOD AND APPARATUS FOR MAKING WATER HAVING PURIFIED AND ACTIVATED FUNCTIONS

BACKGROUND OF THE INVENTION

1. Field of the Invention

This invention relates to method and apparatus for making water having purified and activated functions which is adapted for many applications such as for washing, in drinks, raising and breeding of animals and plants and the like.

2. Description of the Prior Art

Water chiefly employed in our daily life is city water or well water. We make use of city or well water along with food, for drinking, bathing, and for raising of agricultural products, fruits or plants. Moreover, such water is employed for raising or cultivation of fish and shellfish. Aside from city or well water, river water is also used in everyday life, particularly for crops.

City water originates from rivers, lakes or dammed rivers. At present, not only is water from these sources suffering contamination, but also metals such as $Fe^{2+}$ increase in amount owing to the corrosion of water pipes. Thus, the contamination of city water is progressing year by year. To cope with this situation, sterilizing chlorine is incorporated in the city water in larger amounts, with the tendency that the city water is becoming less suited for incorporation in foods and drinks, particularly in large cities. There is the view that when city water is continued in use as drinking water over a long time, there are some adverse influences on health. Further, because city water is employed for cultivation of agricultural products, fruits and plants, and raising of fish and shellfish, the agricultural and marine products thus cultivated may not be of good quality. In addition, with city or well water which is hard water containing metals such as $Ca^{2+}$, $Mg^{2+}$, $Fe^{2+}$ and the like, detergents for washing are required in amounts larger than with ordinary water. The use of such a large amount of a detergent may adversely affect the environment.

It is known to pass contaminated city water through magnets, active carbon or tourmaline to eliminate impurities therefrom, thereby providing drinking water which is good for health. It is also known that such water can be subjected to an electric current to provide acidic water or alkaline water. However, hitherto known procedures are, respectively, intended for only one purpose and are not able to provide water which has a variety of effects and is useful for many purposes.

SUMMARY OF THE INVENTION

In view of the above-described circumstances, the present invention contemplates to treat water employed in daily life, such as city or well water, thereby providing water which has a number of advantages such as good cleansing function, bactericidal action, antifungal action, surface activity, cooling action, in vivo activating function and the like and has for its object the provision of method and apparatus for making purified and activated water by a simple arrangement without use of any electricity.

In order to achieve the above object, there is provided a method for treating water according to the invention which comprises passing water through an ion exchange resin, a mixture of tourmaline and a metal which does not adversely influence the human body on dissolution in water, and rock pieces serving as electron donors, in this order.

The invention also provides a method which comprises passing water through an ion exchange resin, rock pieces which are electron donors, and a mixture of tourmaline and a metal which does not adversely influence the human body on dissolution in water, in this order.

Alternatively, the invention comprises passing water initially through either of a mixture of tourmaline and a metal which does not adversely influence the human body on dissolution in water or rock pieces which are electron donors, and then through the other.

In order to achieve the above object, the present invention provides an apparatus which comprises a soft water generator containing an ion exchange resin therein, an ion generator containing a mixture of tourmaline and a metal which does not adversely influence the human body on dissolution in water, and a rock container containing a rock which is an electron donor, wherein the ion generator and the rock container are connected in series in no special order. The soft water generator is connected in series with the upstream side of the ion generator so that water passing through the ion generator is jetted against the tourmaline and the metal under a hydraulic pressure to agitate the tourmaline and the metal in the ion generator.

More particularly, water is first passed through the soft water generator containing an ion exchange resin to remove metal ions such as $Ca^{2+}$, $Mg^{2+}$, $Fe^{2+}$ and the like, to provide soft water and to generate hydronium ions ($H_3O^+$).

The soft water is then passed through the ion generator having tourmaline and a metal therein. By this, hydronium ions ($H_3O^+$) are generated in large amounts and hydroxyl ions ($H_3O_2^-$) having a greater detergency than the hydronium ions, are also generated. Because tourmaline emits very weak electromagnetic energy (an electromagnetic wave with a wavelength of 4–14 micrometers), harmful gases and heavy metals are eliminated from the water by the action of that very weak energy. This eventually leads to the formation of water which is adapted for use as a drink and which expedites the growth of organisms. The metal exhibits bactericidal or fungicidal and bleaching actions or functions.

The passage through rock pieces which are electron donors contributes to further generation of hydronium ions ($H_3O^+$) and hydroxyl ions ($H_3O_2^-$). The donated electrons will produce a negative potential in the water, thereby producing the cooling effect of water while retarding evaporation of the water.

PREFERRED EMBODIMENTS OF THE INVENTION

Figure 1:
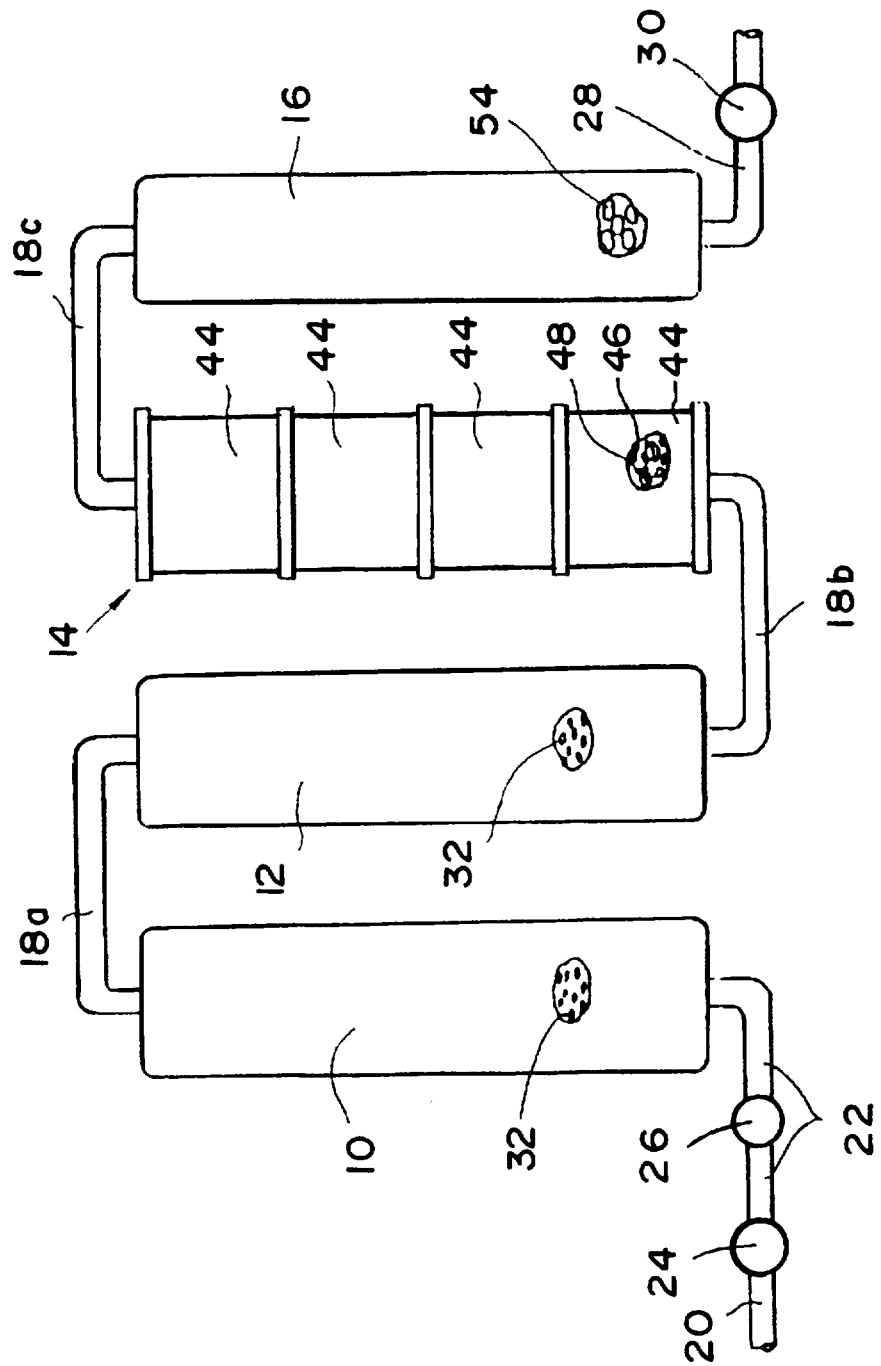
FIG. 1 is a schematic view showing an apparatus for making water having purifying and activating functions according to one embodiment of the invention.

FIG. 1 shows one embodiment of an apparatus for making water having purifying and activating functions according to the invention. A first soft water generator 10, a second soft water generator 12, an ion generator 14, and a rock accommodating container 16 are, respectively, connected through connecting pipes 18a, 18b and 18c in series.

Pressurized water such as, for example, city water, is supplied to the first soft water generator 10 from a water supply pipe 20 through a connecting pipe 22. An on-off inlet valve 24 such as a bib cock is provided between the water supply pipe 20 and the connecting pipe 22 with a check valve 26 being provided within the connecting pipe 22. A delivery pipe 28 is provided at the outlet side of the rock accommodating container 16 and has an outlet on-off valve 30 at the tip of or within the delivery pipe 28.

With city water, water fed from the water supply pipe 20 is passed through the first soft water generator 10, the second soft water generator 12, the ion generator 14 and the rock accommodating container 16, in this order, and is taken out from the delivery pipe 28 by opening the on-off valve 30.

In the case of water other than city water, water stored in a water reservoir, not shown, is introduced through the supply pipe 20 into the first soft water generator 10. In this case, a check valve 26 is provided between a pump and the first soft water generator 10.

Figure 2:
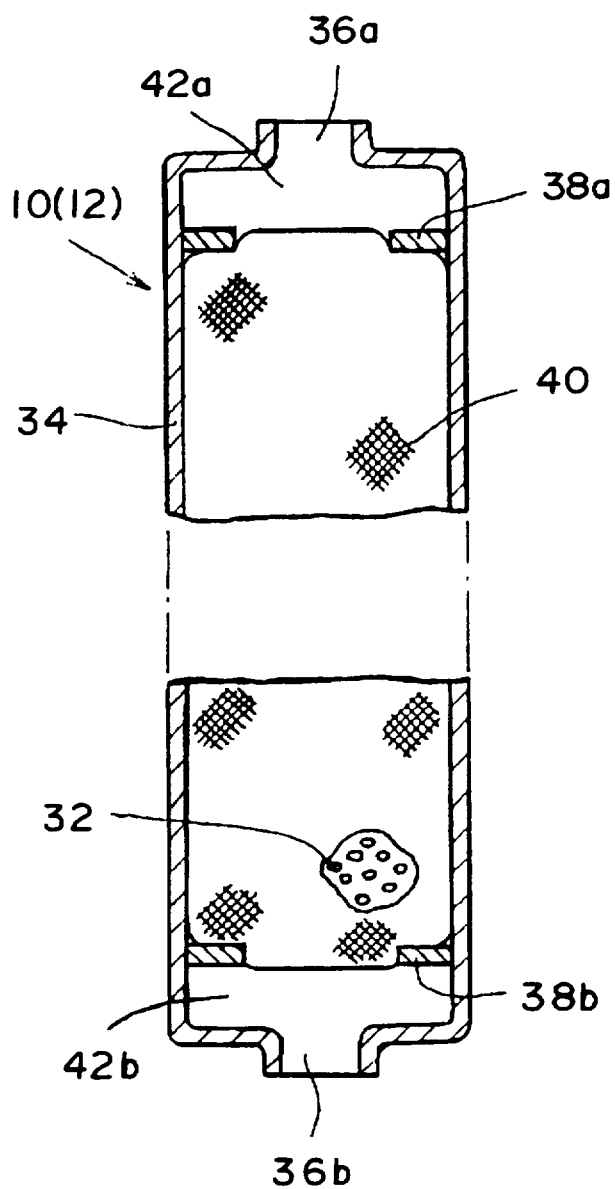
FIG. 2 is a schematic sectional view of a soft water generator which is one component of the apparatus shown in FIG. 1.

The first soft water generator 10 and the second soft water generator 12, respectively, contain a large quantity of a particulate ion exchange resin 32 therein, as shown in section in FIG. 2. The soft water generators 10, 12 each have, respectively, a body 24 which is cylindrical in shape and which has water outlet and inlet ports 36a, 36b at upper and lower ends thereof, respectively. The cylindrical body 34 is provided in its interior with annular, radially extending support members 38a, 38b spaced slightly from the upper and lower ends thereof, each support member 38a, 38b having an opening at the center thereof. The ion exchange resin 32, contained in fine net 40, is held between the paired support members 38a, 38b.

The reason the support members 38 are positioned slightly away from the outlet and inlet ports 36a, 36b is to establish spaces 42a, 42b in the vicinity of the outlet and inlet portions 36a, 36b, respectively, and thereby improve contact of water with the ion exchange resin 32. The reason why the ion exchange resin is placed in the net is to allow the particulate ion exchange resin 32 to be wholly removed along with the net 40.

The first and second soft water generators 10 and 12 each have a height of 80 cm and an inner diameter of 10 cm, for example. The height of the ion exchange resin 32 is set, for example, at 70 cm to permit the upper and lower spaces 42a, 42b to be established. The length of the space allowed for accommodation of the ion exchange resin 32 should be at least sufficient to satisfactorily effect ion exchange. On the other hand, when the length of the ion exchange resin 32 is too great, e.g. over about 200 cm, the ion exchange resin becomes resistant to the passage of water, resulting in a reduced flow rate of water passing through the inside of the soft water generator. Accordingly, the height (length) of the accommodated resin 32 should be determined so as not reduce the flow rate.

The two containers accommodating the ion exchange resin 32 are used. The reason for this is that the first and second soft water generators 10, 12 are thereby allowed a height substantially equal to that of the ion generator 14 and the rock accommodating container 16 and to thereby avoid an excessive reduction in flow rate owing to the pressure loss of water passing therethrough. Of course, the two soft water generators 10, 12 may be combined together to provide one soft water generator. Depending on the flow rate of water, the inner diameter of the soft water generators, the height (length) of the accommodated ion exchange resin 32, the number of the soft water generators to be connected in series may be determined.

The ion exchange resin 32 serves to eliminate metal ions such as $Ca^{2+}$, $Mg^{2+}$, $Fe^{2+}$ and the like from water and to thereby provide soft water. The ion exchange resin 32 used is, for example, a strongly acidic cationic exchange resin ($RzSO_3Na$) obtained by uniform sulfonation of a sphere-shaped styrene.divinyl-benzene copolymer. The ion exchange resin 32 undergoes the following ion exchange reactions with the metal ions such as $Ca^{2+}$, $Mg^{2+}$, $Fe^{2+}$ and the like.

$$2RzSO_3Na + Ca^{2+} \rightarrow (RzSO_3)_2Ca + 2Na^+$$

$$2RzSO_3Na + Mg^{2+} \rightarrow (RzSO_3)_2Mg + 2Na^+$$

$$2RzSO_3Na + Fe^{2+} \rightarrow (RzSO_3)_2Fe + 2Na^+$$

$Ca^{2+}$, $Mg^{2+}$, $Fe^{2+}$ and the like can be eliminated from water by passage through the ion exchange resin 32. The use of the strongly acidic cationic exchange resin ($RzSO_3Na$) as the ion exchange resin 32 results in formation of sodium ions ($Na^+$). While the ion exchange resin 32 may be one which produces ions other than $Na^+$, it should preferably be one which produces $Na^+$.

If city water is used, chlorine is contained in addition to the metal ions such as $Ca^{2+}$, $Mg^{2+}$, $Fe^{2+}$ and the like. The chlorine undergoes no change when city water is passed through the ion exchange resin 32.

On the other hand, when water ($H_2O$) is passed through the ion exchange resin 32, the following changes take place $$H_2O \rightarrow H^+ + OH^- \tag{1}$$

$$H_2O + H^+ \rightarrow H_3O^+ \tag{2}$$

As shown in (1) and (2) above, when water has been passed through the ion exchange resin 32, hydroxide ions ($OH^-$) and hydronium ions ($H_3O^+$) are produced. The resultant water has activity owing to the existence of the hydronium ions ($H_3O^+$).

If hard water is used and passed through the ion exchange resin 32, the metal ions such as $Ca^{2+}$, $Mg^{2+}$, $Fe^{2+}$ and the like are eliminated from the water to provide soft water. The passage through the ion exchange resin 32 results in the generation of $Na^+$, $OH^-$ and hydronium ions ($H_3O^+$) in the water. However, as noted above chlorine (Cl) in city water is passed as is, without undergoing ionization.

Figure 3:
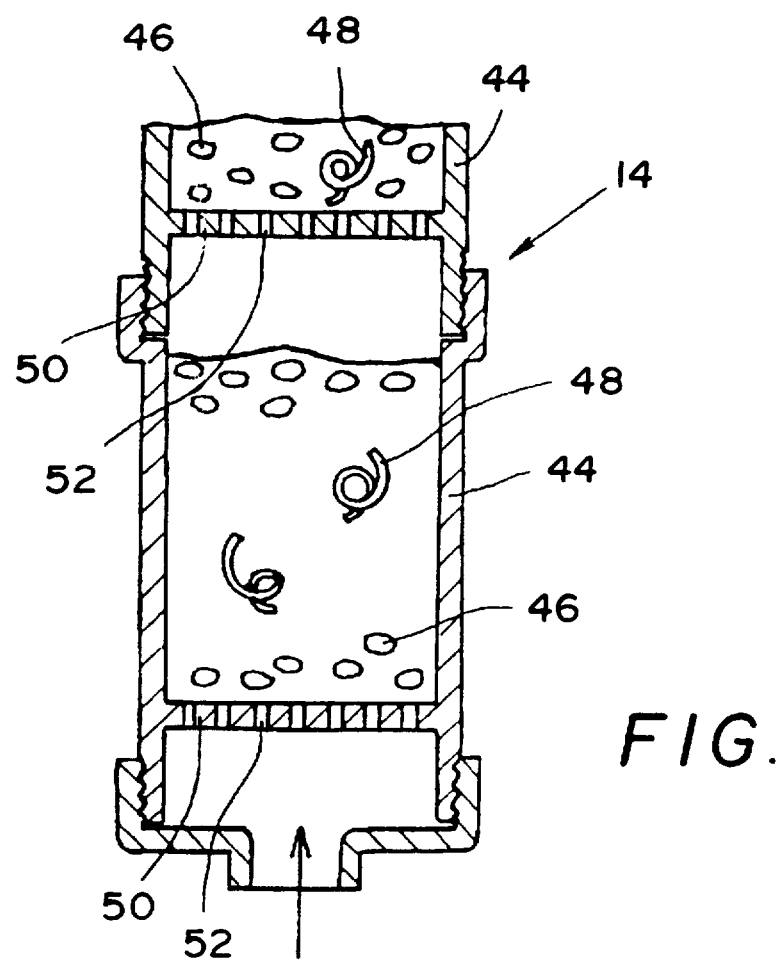
FIG. 3 is a schematic sectional view of an essential part of the soft water generator used in the apparatus shown in FIG. 1.

A partial sectional view of the ion generator 14 is shown in FIG. 3. The ion generator 14 has a plurality of cartridges 44 arranged in a similar manner and continuously connected in series vertically. The individual cartridges 44 contain particulate tourmaline 46 supported on metal plates 48.

The tourmaline has positive and negative poles, by which an electromagnetic wave having a wavelength of 4–14 micrometers is applied to water to generate hydronium ions ($H_3O^+$). Electromagnetic waves having a wavelength of 4–14 micrometers have an energy of 0.004 watts/cm$^2$.

The tourmaline 46 used herein may consist of fine pieces of tourmaline. Alternatively, the tourmaline 46 may be a tourmaline mixture called tourmaline pellets which are commercially available and contain tourmaline, a ceramic and aluminum oxide (which may contain silver therein) in a ratio by weight of about 10:80:10. The ceramic contained in the tourmaline pellets acts to separate the positive and negative poles. The tourmaline pellets may be made by mixing not less than 10 wt % of tourmaline with the ceramic and heating the mixture at 800° C. or over by which the tourmaline disappeared under agitation in water, e.g. within about 3 months for a pellet diameter of 4 mm.

The metal 48 used may be at least one selected from aluminum, a stainless steel and silver. The metal 18 should preferably be one which is not soluble in water. In adds not soluble in water. In addition, it is preferred that the metal does not adversely influence the human body. When used as the metal 18, aluminum has bactericidal, antifungal and bleaching functions. Stainless steel has bactericidal and antifungal activity and detergency-improving activity and silver has bactericidal and antifungal activity. Although aluminum has bleaching activity and stainless steel has detergency improving activity, silver is greater in bactericidal and antifungal activity than aluminum and stainless steel. Accordingly, if bleaching action is necessary along with improved bactericidal or antifungal action, silver is mixed with the aluminum. Copper or lead is not used as the metal 48 because of its toxicity. Expensive materials such as gold are not adopted in view of economy.

The tourmaline 46 and the metal 48 are preferably mixed in a ratio by weight of approximately 10:1–1:10.

The cartridge 44 is in the form of a hollow cylinder open at one end thereof and has a multitude of holes 52 at the bottom 50 thereof. The size of the holes is so set that where the tourmaline mixture 46 and the metal 48 are placed in the cartridge 44, the tourmaline 46 and the metal 48 do not pass through the holes 52 at the bottom 50.

As shown in FIG. 3, the respective cartridges 44 have a multitude of holes 52 at the bottom 50 thereof, on which the tourmaline 46 and the metal 48 are supported. Water is run from the bottom toward to the top of the respective cartridges 44. More particularly, in the cartridges 44, water passing through a multitude of holes 52 at the bottom 50 is passed jetting upwardly through the tourmaline 46 and the metal 48. It will be noted that the size and number of the holes are set so that city water, which has a high hydraulic pressure, is caused to vigorously contact the tourmaline 46 and the metal 48. In this manner, the tourmaline 46 and the metal 48 are agitated in the cartridges 46 by the force of the pressurized water. The agitation of the tourmaline 46 and the metal 48 in the respective cartridges 44 by the force of water being passed may be effected by various known means.

The tourmaline is agitated by the jetting water, with the result that the tourmaline is dissolved in the water to generate a large quantity of hydronium ions ($H_3O^+$). The jetting of pressurized water such as city water through the holes 52 toward the tourmaline allows omission of additional agitator means.

In practice, four cartridges 44, each having an inner diameter of 5 cm and a depth of 7 cm, are stacked one on another. The tourmaline 44 and the metal 48 are charged in the respective cartridges 44 in such an amount that the tourmaline 46 and the metal 48 can be freely moved within the cartridge 44. The number of the cartridges 44 may be increased or decreased, and only one cartridge 44, having a large capacity may be used.

The tourmaline 46 contained in the cartridge 44 disappears in several months by dissolution in water.

The cartridges 44 are arranged as to be readily detached, such as by unscrewing, permitting easy supplement of the tourmaline 46 in the respective cartridges 44. It will be noted that it is not necessary to supplement the metal which is not dissolved in water, but a fresh cartridge containing the tourmaline 46 and the metal 48 may be used for replacement of a used one. The capacity of the cartridge 44 may vary depending on the flow rate.

Because the tourmaline 46 has positive and negative poles when tourmaline is agitated in water, the water ($H_2O$) dissociates into hydrogen ion ($H^+$) and hydroxide ions ($OH^-$).

$$H_2O \rightarrow H^+ + OH^- \qquad (1)$$

Further, hydronium ions ($H_3O^+$) are produced from the hydrogen ions ($H^+$) and water ($H_2O$). The amount of the produced hydronium ions ($H_3O^+$) is far larger than that generated by means of the ion exchange resin 32.

$$H_2O + H^+ \rightarrow H_3O^+ \qquad (2)$$

Part of the hydronium ions ($H_3O^+$) combines with water ($H_2O$) to form hydroxyl ions ($H_3O_2^-$) and hydrogen ions ($H^+$).

$$H_3O^+ + H_2O \rightarrow H_3O_2 + 2H^+ \qquad (3)$$

The hydroxyl ions ($H_3O_2^-$) have high surface activity, like hydronium ions ($H_3O^+$), serving to cleanse clothes.

The water passed through the ion exchange resin 32 is further passed through the ion generator 14. Eventually, hydronium ions ($H_3O^+$), hydroxyl ions ($H_3O_2^-$), $H^+$ and $OH^-$ are generated in the water. The chlorine passed through the ion exchange resin 32 and the $Na^+$ generated at the ion exchange resin 32 pass through the ion generator, as is, without undergoing any reaction.

The water passed through the ion generator is further passed through the rock accommodating container wherein a rock 54 serving as an electron donor is accommodated. The electron donor rock 54 includes obsidian, perlite, or fluorite. Aside from obsidian, perlite, or fluorite, any rock which is an electron donor may be used.

The present invention contemplates conversion of city water not only to clear water, but also to "tasty" water. Of 100 famous waters selected in Japan for their reputed good taste, it has been found that only three brands contained no floating matter, such as "water bloom." Where suspended matter such as "water bloom" is contained, it has previously been very difficult to simply eliminate that matter from the water. When studies were made on a rock site through which the water of the aforementioned three brands ran, it was found that obsidian, perlite, or fluorite was associated with the rock site. We also found that these rocks commonly were electron donors which did not permit the water to become contaminated with suspended matter such as water bloom.

Obsidian, perlite and fluorite rocks have, respectively, an oxidation-reduction potential of –20—-40 mmv. It has been found that when obsidian, perlite or fluorite rock is processed into "perlite," e.g. by breaking obsidian into pieces and heating to not lower than 800°, the oxidation-reduction potential increases to –100—-300 mmv. Accordingly, although the rock 54 which is an electron donor may be composed of raw ores of obsidian, perlite and fluorite, the "perlite" obtained therefrom is preferred. It will be noted that the rock 54 should not be one which is soluble in water nor one which contains something harmful for drinking water. The rock accommodating container 16 is, for example, in the form of a hollow cylinder having an inner diameter of 10 cm and a height of 80 cm. In the cylinder, is loaded granules of the electron-donating rock 54 having a size of 5 mm–50 mm in an amount which does not reduce the flow rate of the water being passed therethrough.

When the water passed through the ion generator 14 is run through the rock container 16, electrons e– are added to the water. As a consequence, the chlorine (Cl) in the city water is converted to chlorine ions by the action of the electrons.

$$Cl + e^- \rightarrow Cl^- \qquad (4)$$

The Cl⁻ and the afore-indicated Na⁺ ions are both stable. The stable condition means that these ions remain a long time without evaporation. The hydroxyl ions ($H_3O_2^-$) are also stable.

By the passage of the water through the rock 54, more hydronium ions ($H_3O^+$) are generated in comparison with the case of water passed through the ion generator 14, along with hydroxyl ions ($H_3O_2^-$) also being generated.

$$H_2O + H^+ \rightarrow H_3O^+ \qquad (2)$$

$$H_3O^+ + H_2O \rightarrow H_3O_2^- + 2H^+ \qquad (3)$$

The passage of water through the rock 54 brings about the following reactions in addition to those mentioned above.

$$OH^- + H^+ \rightarrow H_2O \qquad (5)$$

$$2H^+ + 2e^- \rightarrow 2H_2 \qquad (6)$$

Moreover, when water is passed through the rock container 16, the oxidation-reduction potential of the water is changed from +340 mmv to −20—−240 mmv by means of the electrons donated by the rock 54. Using hot water in place of water, the negative oxidation-reduction potential becomes more stabilized.

As stated hereinabove, water is initially passed through the ion exchange resin 32, then through the tourmaline 46 and the metal 48 and finally through the rock 54, thereby obtaining a treated water which contains Na⁺, Cl⁻, H⁺, OH⁻, hydronium ions ($H_3O^+$) and hydroxyl ions ($H_3O_2^-$). The treated water has an oxidation-reduction potential of −20—240 mmv.

The results of quality inspection of the treated water were as follows. The values for city water are indicated in parentheses for comparison with the treated water and those cases where the value of city water was same as that of the treated water are indicated as "(same)."

The nitrous acid-derived nitrogen and nitric acid-derived nitrogen: 1.8 mg/l (same), chlorine ion: 6.8 mg/l (9.0 mg/l), general bacteria: 0/ml (same), cyan ion: less than 0.01 mg/l (same), mercury: less than 0.0005 mg/l (same), organic phosphorus: less than 0.1 mg/l (same), copper: less than 0.01 mg/l (same), iron: less than 0.05 mg/l (less than 0.080 mg/l), manganese: less than 0.01 mg/l (same), zinc: less than 0.05 mg/l (less than 0.054 mg/l), lead: less than 0.01 mg/l(same), hexavalent chromium: less than 0.02 mg/l (same), cadmium: less than 0.005 mg/l (same), arsenic: less than 0.005 mg/l (same), fluorine: less than 0.15 mg/l (same), calcium-magnesium (hardness): 1.2 mg/l (49.0 mg/l), phenols less than 0.005 mg/l(same), anionic surface active agent: less than 0.2 mg/l(same), pH value: 6.9 (same), odor: no offensive odor (same), taste: not abnormal taste (same), chromaticity: 2 degrees (same), and turbidity: 0 degree (one degree).

The treated water has the following many effects:

Surface activity

The hydronium ions ($H_3O^+$) and hydroxyl ions ($H_3O_2^-$) present in the treated water have surface activity (O/W type emulsion emulsifying action). If the treated water is used in a washing machine, no detergent is necessary. This water may be used, not only for washing in washing machines, but also in all the fields where detergents are used, e.g. such as in dishwashing machines or for washing bath tubs. More particularly, when the treated water is used for washing in dishwashing machines or bath tubs, table wares and the like may be washed without use of any detergent. The use of the treated water requires no use of any detergent, thus providing a good economy. In addition, the ecological contamination problem caused by free discharge of wash water can be avoided.

Emission of electromagnetic wave energy ("rearing light ray")

Tourmaline emits a very weak wave energy (a wavelength of 4–14 micrometers). This weak energy subjects complexes to scission, releasing toxic gases and heavy metals. More particularly, when very weak energy (an electromagnetic waves with a wavelength of 4–14 micrometers) is applied to the complexes, harmful gas escapes into the air and heavy metals settle out. Thus, the resultant water is harmless for human consumption. This weak energy emission may be called a "rearing light ray" and is absorbable light energy which is susceptible to absorption in material bodies, animals and plants. The weak energy absorbed in materials, animals and plants favorably influences the materials, bodies and the cells of animals and plants, including human beings, expediting the growth of these organisms.

It will be noted that, while the cells of the human body have an energy of 0.003 watts/cm², the energy of the 4–14 micrometer electromagnetic wave-emitting substance derived from the tourmaline is 0.004 watts/cm². Thus, the weak energy emitted by tourmaline is similar to that of the human body with respect to the wavelength and energy level, so that it is resonantly absorbed in the human body. The very weak energy is higher by 0.001 watt/cm² than that of the human body, thus exciting the atoms, molecules and cells of the human body, bringing about a good influence on human health. In particular, the energy which is higher by 0.001 watt/cm² than that of the human body serves to remove by reduction active oxygen which exists in the human body and causes disease.

Antifungal and bactericidal actions

Aluminum, stainless steels and silver used as the metal 48 all have antifungal and bactericidal actions. Where Na⁺ is generated by means of the ion exchange resin 32, Na⁺ also exhibits antifungal and bactericidal actions. When drinks are made by use of the treated water or where foods are dipped in the treated water, little decay takes place as compared with the case using city water. Moreover, when the water is applied to plants, the plants are unlikely to become infested with harmful insects or worms.

Bleaching action

Aluminum has bleaching action. If aluminum is added in large amounts, a bleaching effect appears on washing.

Action of retarding evaporation of water

City water and water, for example in the amount of 1000 cc, were each heated from room temperature for comparison. The temperature at which bubbles appeared was 36° C. or higher for the city water and 43° C. or higher for the treated water. The temperature at which vapor appears is 40° C. or higher for the city water and 48° C. or higher for the treated water. Thus, the temperatures at which bubbles and vapor started to appear are higher for the treated water than for the city water. This is considered to result from the electrons derived from the rock 54.

The temperatures at which bubbles and vapor started to appear are higher for treated water than for city water. If something is boiled, the treated water will require more boiling time than city water because vapor is less likely to develop for the treated water than for the city water. Moreover, evaporation proceeds more slowly for the treated water, so that the amount or number of waterings of flowering plants may be reduced.

Cooling action

Water passed through the rock 54 donating electrons has an oxidation-reduction potential of −20—−240 mmv and its temperature becomes lower by 2°–3° C. than that of ordinary water. Thus, the treated water has the effect of preserving and cooling foods.

Suspended matter-eliminating action

Where suspended matter such as water bloom is present in water, it can be eliminated.

Second Example

Figure 4:
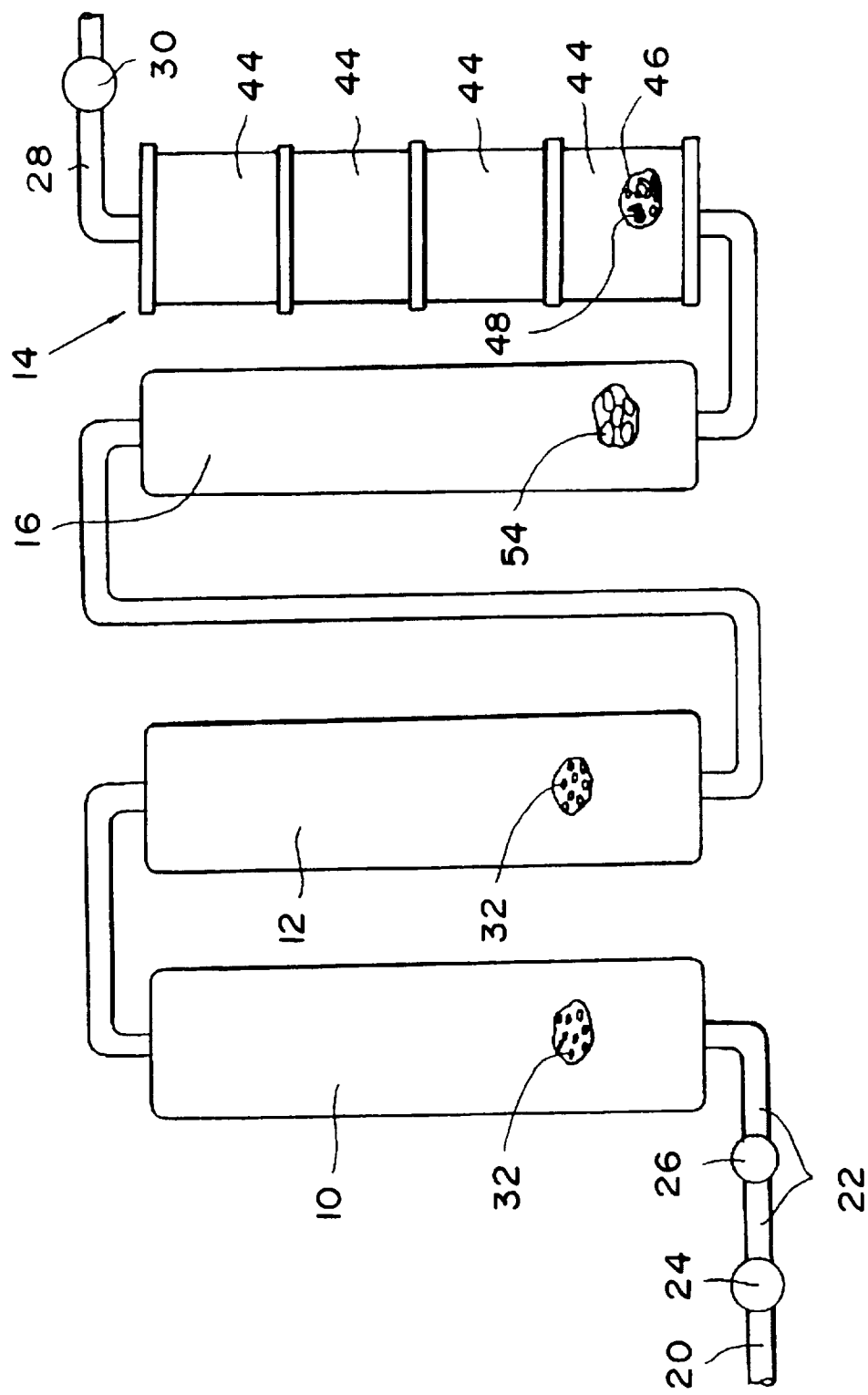
FIG. 4 is a schematic view showing an apparatus for making water having purifying and activating functions according another embodiment of the invention.

In the first example, water was passed through the ion exchange resin 32, tourmaline 42 and metal 48 and rock 54 in this order. It is also possible to pass water in order through the ion exchange resin 32, rock 54, and tourmaline 46 and metal 48. More particularly, as shown in FIG. 4, water may be passed through the first soft water generator 10, second soft water generator 12, rock accommodating container 16 and ion generator 14, in this order. In this case, the water passes through the ion generator from the bottom to the top.

In this second example, water passed through the ion exchange resin is then passed through the rock 54. By the action of the rock 54, electrons are generated in water. As a result, chlorine present in city water is converted into chlorine ions by reaction (4).

$$Cl+e^- \rightarrow Cl^- \quad (4)$$

$Cl^-$ and the $Na^+$ generated by the action of the ion exchange resin 32 are stable ions. Water which has been passed through the ion exchange resin 32 need not contain any $Na^+$.

The water passed through the ion exchange resin 32 has, as shown in the afore-indicated formulas (1) and (2), $H^+$, $OH^-$ and hydronium ions ($H_3O^+$). The water passed through the ion exchange resin 32 is next passed through the rock 54, whereupon the following reactions take place.

$$OH^- + H^+ \rightarrow H_2O \quad (5)$$

$$H_2O + H^+ \rightarrow H_3O^+ \quad (2)$$

$$2H^+ + 2e^- \rightarrow 2H_2 \quad (6)$$

In these reactions, hydronium ions ($H_3O^+$) are produced in amounts larger than those generated in passage through the ion exchange resin 32.

As stated hereinabove, when water is passed through the rock 54 after passage through the ion exchange resin 32, $Cl^-$ and hydronium ions ($H_3O^+$) are additionally generated along with $Na^+$ and $Cl^-$ which have been present in the water. The water passed through the rock 54 has an oxidation-reduction potential of −20—−240 mmv. If hot water is used in place of room temperature water, the negative oxidation-reduction potential becomes more stabilized.

The water passed through the rock 54 is then passed through the ion generator 14 containing the tourmaline and the metal 48 therein, undergoing the following reactions.

$$H_2O \rightarrow H^+ + OH^- \quad (1)$$

$$H_2O + H^+ \rightarrow H_3O^+ \quad (2)$$

The hydronium ions ($H_3O^+$) are generated in large amounts. Part of the hydronium ions ($H_3O^+$) is converted to hydroxyl ions ($H_3O_2^-$)

$$H_3O^+ + H_2O \rightarrow H_3O_2^- + 2H^+ \quad (3)$$

As a result, the water which has been passed through the tourmaline 46 and the metal 48 contains $Na^+$, $Cl^-$ and $OH^-$, which have previously been present in the water, along with the hydronium ions ($H_3O^+$), hydroxyl ions ($H_3O_2^-$) and $H^+$.

More particularly, the treated water produced in the second example and the treated water produced in the first example each have $Na^+$, $Cl^-$, $OH^-$, hydronium ions ($H_3O^+$), hydroxyl ions ($H_3O_2^-$) and $H^+$, and are the same in composition. Moreover, the treated water emits a 4–14 micrometer electromagnetic wave having an energy of 0.004 watts/cm² and has an oxidation-reduction potential of −20—−240 mmv. As a result, the treated water produced in the second example has the same effect as that obtained in the first example.

[Third Example]

In the third example, the first soft water generator 10 and the second soft water generator 12 in FIG. 1 are not used, but the ion generator 14 having the tourmaline 46 and the metal 48 and the rock accommodating container 16 having the rock 54 therein are connected in series.

Without passage through the ion exchange resin, city water passed to the ion generator 14 contains metal ions such as $Ca^{2+}$, $Mg^{2+}$, $Fe^{2+}$ and the like. $H^+$, $OH^-$ and hydronium ions ($H_3O^+$) are not generated as shown in the above formulas (1) and (2).

When city water is passed through the ion generator 14, hydrogen ions ($H^+$) and hydroxide ions ($OH^-$) are generated.

$$H_2O \rightarrow H^+ + OH^- \quad (1)$$

Of these hydrogen ions ($H^+$) and hydroxide ions ($OH^-$), the hydrogen ions ($H^+$) combine with water ($H_2O$) to form hydronium ions ($H_3O^+$).

$$H_2O + H^+ \rightarrow H_3O^+ \quad (2)$$

The hydronium ions ($H_3O^+$) have surface activity and serve to cleanse clothes.

In the water which has passed through the ion generator 14 containing the tourmaline 46 and the metal 48, there are generated $H^+$, $OH^-$ and hydroxyl ions ($H_3O_2^-$).

The treated water emits electromagnetic waves with a wavelength of 4–14 micrometers and having an energy of 0.004 watts/cm².

The water passed through the ion generator 14 is then passed through the rock by which chlorine contained in the city water is converted into chlorine ions by the action of the donated electrons.

$$Cl + e^- \rightarrow Cl^- \quad (4)$$

The $Cl^-$ is a stable ion. The stable condition means that the ionic condition is kept over a long time without evaporation. In addition, hydronium ions ($H_3O^+$) also generate. Part of the hydronium ions ($H_3O^+$) react with water to provide hydroxyl ions ($H_3O_2^-$).

$$H_3O^+ + H_2O \rightarrow H_3O_2^- \quad (3)$$

The hydroxyl ions ($H_3O_2^-$) are also stable ions. The passage of the water through the rock 54 entails the following reactions.

$$OH^- + H^+ \rightarrow H_2O \quad (5)$$

$$2H^+ + 2e^- \rightarrow 2H_2 \quad (6)$$

The passage of the water through the rock 54 results in the formation or presence of $OH^-$, $H^+$, hydronium ions ($H_3O^+$) and hydroxyl ions ($H_3O_2^-$). The passage of the water through the rock 54 also leads to an oxidation-reduction potential of −20—−240 mmv.

In this third example, water is not passed through an ion exchange resin, so that metal ions such as $Ca^{2+}$, $Mg^{2+}$, $Fe^{2+}$ and the like are contained in water, which differs from the first and second examples. More particularly, the final treated water is hard water and is lower in detergent effect than water obtained in the first and second examples. Since $Na^+$ is not contained, antifungal and bactericidal activities are slightly lower.

However, water is passed through the metal and is thus imparted with an electromagnetic energy of wavelength ranges 4—14 micrometers and an oxidation-reduction potential of −20-240 mmv. Hence, the treated water has the very weak energy ("rearing light ray") of (b), antifungal and bactericidal activities of (c), bleaching action of (d), action of retarding evaporation of water of (e), cooling action of (f) and action for eliminating suspended matter of (g).

[Fourth Example]

In this fourth example, the ion generator 14 and the rock accommodating container 16 used in the third example are switched in order. Since water is not passed through the ion exchange resin 32, it is initially passed through the rock 54, followed by passage through a mixture of the tourmaline 46 and the metal 48. Similar to the third example, metals such as $Ca^{2+}$, $Mg^{2+}$, $Fe^{2+}$ and the like are contained in final treated water but no $Na^+$ is present.

When city water is passed through the rock accommodating container 16, chlorine is converted into chlorine ions by the donated electrons.

$$Cl+e^- \rightarrow Cl^- \quad (4)$$

The water having passed through the rock 54 is passed through a tourmaline mixture 46 and a metal 48 to permit water ($H_2O$) to dissociate into hydrogen ($H^+$) and hydroxide ion ($OH^-$).

$$H_2O \rightarrow H^+ + OH^- \quad (1)$$

The hydrogen ions ($H^+$) and water ($H_2O$) combine to generate hydronium ions ($H_3O^+$).

$$H_2O + H^+ \rightarrow H_3O^+ \quad (2)$$

More particularly, when water is passed through the rock 54, ($OH^-$), $H^+$ and $H_3O^+$ are formed as shown in (1) and (2). Moreover, the passage of water through the rock 54 results in water having an oxidation-reduction potential of −20—240 mmv.

The water passed through the rock 54 is in turn passed through the ion generator 14 containing the tourmaline 46 and the metal 48. By this, hydronium ions ($H_3O^+$) are further generated. Part of the hydronium ions ($H_3O^+$) react with water to provide hydroxyl ions ($H_3O_2^-$).

$$H_3O^+ + H_2O \rightarrow H_3O_2^- + H^+ \quad (3)$$

When water passes through the rock 54, the following reaction takes place.

$$OH^- + H^+ \rightarrow H_2O \quad (5)$$

With the water which has been initially passed through the rock 54 and then through the tourmaline mixture 46 and the metal 48, $Cl^-$, $OH^-$, hydronium ions ($H_3O^+$) and hydroxyl ions ($H_3O_2^-$) are generated as shown in (4), (1), (2) and (3). This treated water has electromagnetic energy with a wavelength of 4–14 micrometers.

In this fourth example, since water is not passed through an ion exchange resin, metals such as $Ca^{2+}$, $Mg^{2+}$, $Fe^{2+}$ and the like are contained in the final treated water. This differs from the cases of the first and second examples. As a result, the treated water so obtained is hard water and is lower in detergency action than the water obtained in the first and second examples. Since $Na^+$ is not present, the antifungal and bactericidal activities are slightly lower.

However, since water is passed through the metal 48 and thus has an electromagnetic energy with a wavelength of 4–14 micrometers and an oxidation-reduction potential of −20—240 mmv, the resultant water has the very weak energy ("rearing light ray") (b), antifungal and bactericidal activities of (c), bleaching action (d), action of retarding evaporation of water (e), cooling action (f) and action for eliminating suspended matter (g).

In conventional water purifying apparatus, electricity is used for generation of ions, with higher cost and with the need of aftercare. On the contrary, in the apparatus of the present invention, it is sufficient to wash or supplement materials without any specific maintenance. In addition, anyone can readily wash or supplement the materials without difficulty.

What is claimed is:

1. A method for purifying and activating water comprising passing water through an ion exchange resin, then through a mixture of tourmaline and a metal, and then through a particulate rock selected from the group consisting of obsidian, perlite and fluorite.

2. A method according to claim 1, wherein said ion exchange resin generates sodium ions through ion exchange.

3. A method according to claim 1, wherein said tourmaline is in the form of pellets formed by mixing not less than 10 wt % tourmaline with a ceramic and heating the mixture to 800° C. or higher.

4. A method according to claim 1, further comprising agitating said tourmaline and said metal by said passing of water therethrough.

5. A method according to claim 1, further comprising heating said rock to 800° C. or higher.

6. A method according to claim 1 wherein said water contains chlorine and wherein said chlorine reacts with electrons donated by said rock to form chloride ions.

7. A method according to claim 1 wherein said water reacts with electrons donated by said rock to form hydronium ions.

8. A method according to claim 1, wherein said metal is at least one member selected from the group consisting of aluminum, stainless steel and silver.

9. A method according to claim 8, wherein said tourmaline and said metal are mixed in a weight ratio of 10:1–1:10.

10. A method for purifying and activating water comprising passing the water through an ion exchange resin, then through a rock selected from the group consisting of obsidian, perlite and fluorite and then through a mixture of tourmaline and a metal.

11. A method according to claim 10, wherein said ion exchange resin generates sodium ions through ion exchange.

12. A method according to claim 10, wherein said tourmaline is in the form of pellets formed by mixing not less than 10 wt % tourmaline with a ceramic and heating the mixture to 800° C. or higher.

13. A method according to claim 10, further comprising agitating said tourmaline and said metal by said passing of water therethrough.

14. A method according to claim 10, further comprising heating said rock to 800° C. or higher.

15. A method according to claim 10 wherein said water contains chlorine and wherein said chlorine reacts with electrons donated by said rock to form chloride ions.

16. A method according to claim 10, wherein said metal is at least one member selected from the group consisting of aluminum, stainless steel and silver.

17. A method according to claim 16, wherein said tourmaline and said metal are mixed in a weight ratio of 10:1–1:10.

18. A method for purifying and activating water, comprising:

passing the water initially through either of (1) a mixture tourmaline and a metal and (2) a rock selected from the group consisting of obsidian, perlite and fluorite, and then through the other.

19. A method according to claim 18, wherein said tourmaline and said metal are mixed in a weight ratio of 10:1–1:10.

20. A method according to claim 18, wherein said tourmaline is in the form of pellets formed by mixing not less than 10 wt % tourmaline with a ceramic and heating the mixture to 800° C. or higher.

21. A method according to claim 18, further comprising agitating said tourmaline and said metal by said passing of water therethrough.

22. A method according to claim 18, further comprising heating said rock to 800° C. or higher.

23. A method according to claim 18 wherein said water contains chlorine and wherein said chlorine reacts with electrons donated by said rock to form chloride ions.

24. An apparatus for purifying and activating water comprising:

a soft water generator containing an ion exchange resin therein, an ion generator containing a mixture of tourmaline and a metal, and a rock container containing a rock selected from the group consisting of obsidian, perlite and fluorite, wherein the ion generator and the rock container are connected in series and wherein the soft water generator is connected upstream of the ion generator so that water passing through the soft water generator is jetted against the tourmaline and the metal under a hydraulic pressure to agitate the tourmaline and the metal in the ion generator.

25. An apparatus according to claim 24, further comprising means for passing the water through said ion generator from bottom to top and wherein said ion generator includes a plate supporting said mixture which has small holes for passage of the water, whereby the water passed through the small holes is jetted against the tourmaline and the metal to agitate same within said ion generator.

26. An apparatus according to claim 24, wherein said soft water generator has an inlet, an outlet and spaces between said inlet and said mixture and between said outlet and said mixture, said spaces being free of ion exchange resin.

* * * * *